C. CRETORS.
CORN POPPING APPARATUS.
APPLICATION FILED MAY 5, 1913.
1,116,568.
Patented Nov. 10, 1914.
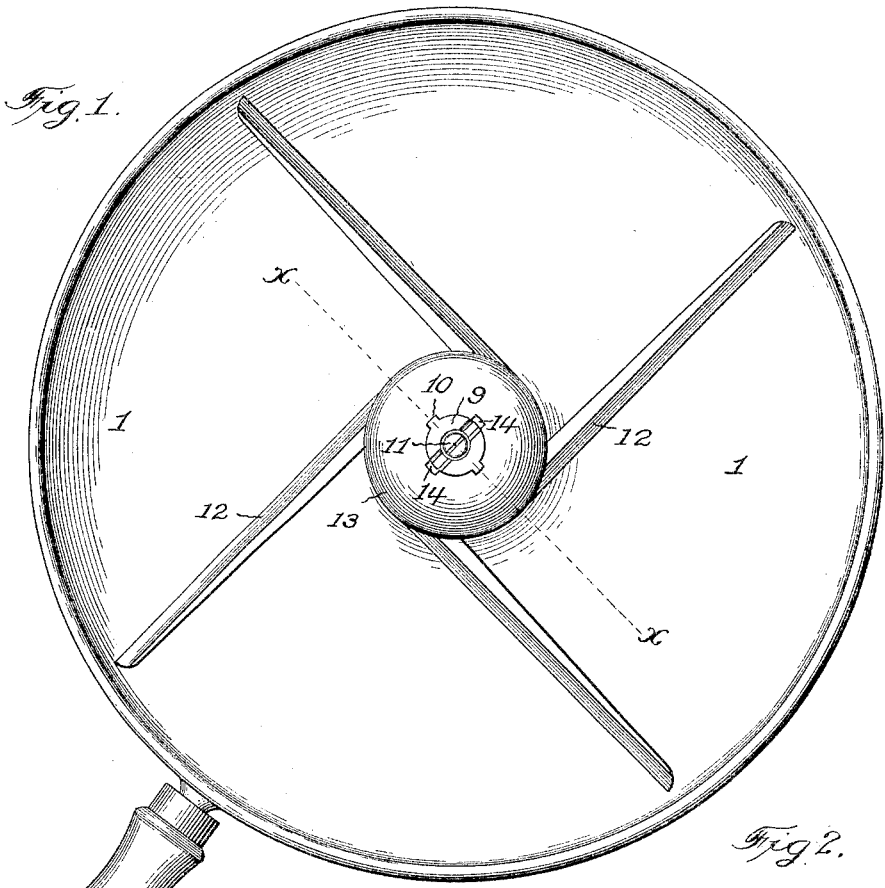
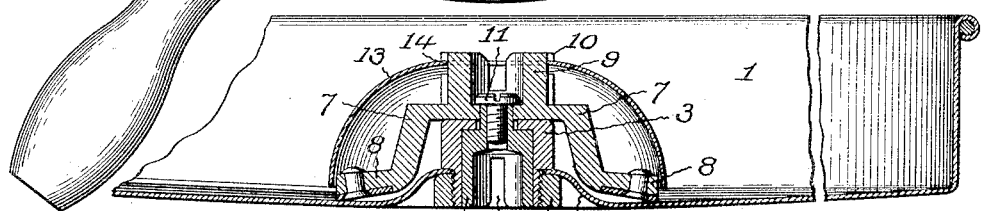
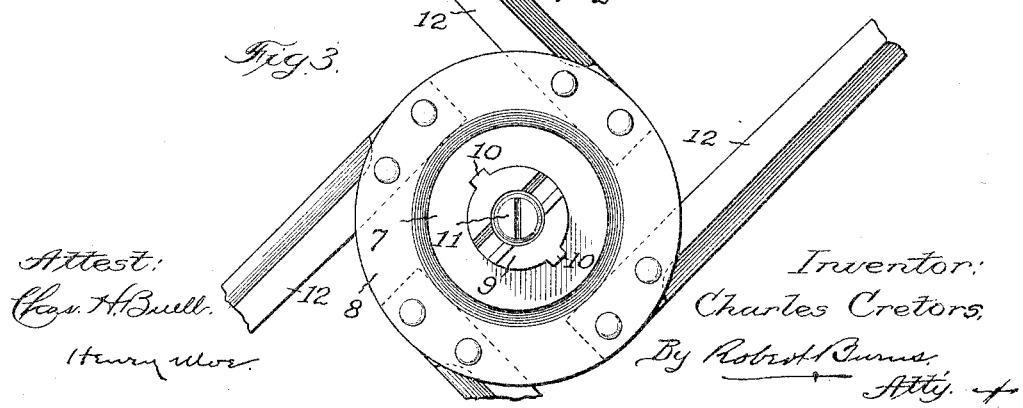
Attest:
Chas. H. Buell.
Henry Moe.
Inventor:
Charles Cretors,
By Robert Burns
Atty.

UNITED STATES PATENT OFFICE.

CHARLES CRETORS, OF CHICAGO, ILLINOIS.

CORN-POPPING APPARATUS.

1,116,568.  Specification of Letters Patent.  Patented Nov. 10, 1914.

Application filed May 5, 1913. Serial No. 765,482.

*To all whom it may concern:*

Be it known that I, CHARLES CRETORS, a citizen of the United States of America, and a resident of Chicago, in the county of Cook, State of Illinois, have invented certain new and useful Improvements in Corn-Popping Apparatus, of which the following is a specification.

This invention relates to the pan and stirrer mechanism of corn popping apparatus such as constitutes the subject matter of my prior Letters Patent Nos. 728,550 and 862,964, dated May 10, 1903, and August 13, 1907, respectively. And the present improvement has for its object to provide a simple and efficient structural formation and disposition of parts, whereby a very effective stirring of the corn kernels is attained, with a prevention of the scorching of portions of the material which usually occurs in the ordinary type of popping apparatus, and with which the bottom plate of the popping pan is reinforced and made plane, so that an intimate contact therewith of the stirrer blades is had and maintained during continued use, all as will hereinafter more fully appear.

In the accompanying drawings: Figure 1, is a plan view of a popping pan and stirrer embodying the present invention. Fig. 2, is an enlarged detail section of the same, on line $x$—$x$, Fig. 1. Fig. 3, is an enlarged detail plan view of the stirrer hub and blades, with the central deflecting dome removed.

Similar reference numerals indicate like parts in the several views.

Referring to the drawings, 1 represents a shallow open-top pan adapted to be supported above a gas or like heater, as set forth in my aforesaid Letters Patent Nos. 728,550 and 862,964. In the present construction the pan 1 has its bottom plate dished downwardly and formed with a centrally apertured and upwardly extending reinforcing dome 2, for the reception of the journal bushing of the stirrer mechanism. Said central reinforcing dome 2, is adapted to form a receiving cavity for the holding nut hereinafter described, and while affording added stiffness to the bottom, is also adapted to render the manufacture of the pan with a plane surface an easy and certain operation.

3 is the cylindrical journal bushing above referred to, having at its lower end a reduced and screw-threaded neck for the reception of the screw-threaded nut or collar 4, by which the bushing is clamped in place in the central aperture of the central dome of the pan bottom, above described. At the upper end of the central bore of said bushing 3, an inturned rim is provided for the abutment of the driving hub of the stirrer mechanism.

5 is the driving hub above referred to, formed at top with a reduced neck disposed in the reduced upper portion of the bore of the bushing 3, and with a central screw-threaded orifice for connection with the carrying hub of the scraper blades. The main body of the driving hub 5 has a central bore, the walls of which are formed with radial slots 6, for driving engagement with a vertical operating shaft provided with lateral pins adapted for engagement in said radial slots 6, as described in detail in my above mentioned Letters Patent.

7 is the carrying hub of the stirrer blades, formed with a cup-shape body portion adapted to fit over and inclose the bushing 3 aforesaid. At its bottom said hub 7 is provided with an annular portion or rim 8 to which the stirrer blades are secured, and at its top with an upper sleeve portion 9 slotted radially for engagement with the usual carrying shaft of the pan cover, described in detail in my before mentioned Letters Patent. Near its top the aforesaid sleeve portion 9 carries a pair of overhanging ears 10, adapted for holding engagement with the hereinafter described deflector cap or shell.

11 is a centrally disposed screw for connecting the carrying hub 7, to the driving hub 5, above described.

12 are the stirrer blades, preferably formed of bars of resilient metal and sharpened at the front to scraping edges as shown. In the present improvement said blades are secured by rivets or like fastening means to the undersurface of the circular skirt portion 8 of the carrying hub 7, in a tangential position with relation to the periphery of the skirt portion 8, and as so arranged are adapted to provide a ready and substantial attachment of the parts together, while the tangential disposition of the blades is adapted to attain a very efficient outward shifting and stirring of the contents upon the bottom of the pan, and thus attain an even and uniform popping of the corn with an avoidance of accidental scorching of the same.

13 is a detachable dome shape deflector cap or shell, adapted to fit over the carrying hub 7 of the stirrer blades, and direct the material operated on, outwardly to said blades. Said shell or cap is formed with a central and diametrically notched orifice 14 adapted to pass over the upper end of the sleeve portion 9 and its overhanging ears 10, and by a circular turn attain holding engagement beneath said ears. With the above described construction said deflector cap or shell is capable of ready detachment, when it is desired to clean or repair the stirrer mechanism.

Having thus fully described my said invention what I claim as new and desire to secure by Letters Patent, is:—

1. The combination of a popping pan having a downwardly dished bottom the central portion of which is formed into an upwardly extending centrally apertured dome, a journal bushing secured in the central aperture of said dome, a stirrer hub journaled in said bushing and having a depending outer skirt portion, and a series of stirrer blades secured to said skirt portion.

2. The combination of a popping pan having a downwardly dished bottom the central portion of which is formed into an upwardly extending apertured dome, a journal bushing secured in the aperture of said dome, a driving hub disposed in the lower portion of said bushing, a stirrer carrying hub having a depending skirt portion, a series of stirrer blades secured to said skirt portion, and a centrally disposed screw connecting the driving hub and carrying hub together.

3. The combination of a popping pan having a downwardly dished bottom the central portion of which is formed into an upwardly extending apertured dome, a journal bushing secured in the aperture of said dome, a driving hub disposed in the lower portion of said bushing, a stirrer carrying hub having a depending skirt portion, a series of stirrer blades secured to said skirt portion, a centrally disposed screw connecting the driving hub and the carrying hub together, and a detachable dome shape cap disposed over the stirrer carrying hub and adapted to deflect the material outwardly toward the stirrer blades.

Signed at Chicago, Illinois, this 1st day of May, 1913.

CHARLES CRETORS.

Witnesses:
ROBERT BURNS,
HENRY MOE.

Copies of this patent may be obtained for five cents each, by addressing the "Commissioner of Patents, Washington, D. C."